US010778916B2

(12) United States Patent
Jahagirdar

(10) Patent No.: US 10,778,916 B2
(45) Date of Patent: Sep. 15, 2020

(54) APPLYING AN ANNOTATION TO AN IMAGE BASED ON KEYPOINTS

(71) Applicant: Honeywell International Inc., Morris Plains, NJ (US)

(72) Inventor: Manik Mahesh Jahagirdar, Edina, MN (US)

(73) Assignee: Honeywell International Inc., Charlotte, NC (US)

( * ) Notice: Subject to any disclaimer, the term of this patent is extended or adjusted under 35 U.S.C. 154(b) by 147 days.

(21) Appl. No.: 16/169,879

(22) Filed: Oct. 24, 2018

(65) Prior Publication Data

US 2020/0137326 A1    Apr. 30, 2020

(51) Int. Cl.
*G06T 3/40* (2006.01)
*H04N 5/345* (2011.01)
*G06T 17/05* (2011.01)

(52) U.S. Cl.
CPC ............. *H04N 5/3456* (2013.01); *G06T 3/40* (2013.01); *G06T 17/05* (2013.01)

(58) Field of Classification Search
CPC ......... G06T 3/0068; G06T 7/174; G06T 7/30; G06T 7/33; G06T 7/337; G06T 7/38; G06T 7/70; G06T 7/73; G06T 7/74; G06K 9/00711; G06K 9/00718; G06K 9/6201; G06K 9/6202
See application file for complete search history.

(56) References Cited

U.S. PATENT DOCUMENTS

| 7,925,980 | B2 | 4/2011 | Bakir et al. | 715/740 |
| 8,102,423 | B2 | 1/2012 | Cheng | 348/159 |
| 8,422,832 | B2 | 4/2013 | Makadia et al. | 382/305 |
| 8,874,284 | B2 | 10/2014 | Sanders-Reed | 701/3 |
| 8,890,954 | B2 | 11/2014 | O'Donnell et al. | H04N 5/23206 |

(Continued)

FOREIGN PATENT DOCUMENTS

| WO | 2017077543 A1 | 5/2017 | G06K 9/00 |
| WO | 2018123360 A1 | 7/2018 | H04N 5/345 |

OTHER PUBLICATIONS

McCormick, "Taking to the Sky: Integrating Fulcrum & DroneDeploy," Fulcrum—mobile location leverage, Apr. 25, 2017, 16 pp.

(Continued)

*Primary Examiner* — Andrew W Johns
(74) *Attorney, Agent, or Firm* — Shumaker & Sieffert, P.A.

(57) ABSTRACT

In some examples, a computing device includes a display, processing circuitry configured to present a first image via the display, and an input device configured to receive user inputs. The processing circuitry is further configured to determine an annotation to the first image based on the user inputs and determine an image patch in the first image overlapping with the annotation. The processing circuitry is also configured to determine, in the image patch, a first set of keypoints associated with the annotation and match the first set of keypoints in the first image to a second set of keypoints in the corresponding image patch in the second image. The processing circuitry is configured to determine a position of the corresponding image patch in the second image based on matching the first set of keypoints to the second set of keypoints and apply the annotation to the second image.

20 Claims, 10 Drawing Sheets

(56) References Cited

U.S. PATENT DOCUMENTS

| | | | |
|---|---|---|---|
| 8,897,575 B2 | 11/2014 | Ding et al. | G06K 9/4671 |
| 8,970,400 B2 | 3/2015 | Verna et al. | H04L 67/26 |
| 9,183,604 B2 | 11/2015 | Lauper et al. | G06T 1/00 |
| 9,251,431 B2 | 2/2016 | Doepke et al. | G06K 9/46 |
| 9,347,792 B2 | 5/2016 | Meeker et al. | G01C 23/00 |
| 9,599,985 B2 | 3/2017 | Wang et al. | G05D 1/0022 |
| 9,977,978 B2 | 5/2018 | Coulter et al. | G06K 9/3216 |
| 10,176,388 B1* | 1/2019 | Ghafarianzadeh et al. | G06K 9/00671 |
| 10,491,778 B2* | 11/2019 | De Mers et al. | H04N 1/32101 |
| 10,614,335 B2* | 4/2020 | Cohen-Solal et al. | G06K 9/6202 |
| 2001/0041021 A1 | 11/2001 | Boyle et al. | 382/305 |
| 2011/0187563 A1 | 8/2011 | Sanders-Reed | 340/971 |
| 2012/0294537 A1 | 11/2012 | Wallace et al. | 382/201 |
| 2014/0289605 A1* | 9/2014 | Buelow et al. | A61B 6/468 715/232 |
| 2016/0295038 A1 | 10/2016 | Rao et al. | H04N 1/00244 |
| 2017/0006240 A1 | 1/2017 | Sron | H04N 5/357 |
| 2017/0076438 A1 | 3/2017 | Kottenstette et al. | G06T 7/004 |
| 2017/0118539 A1 | 4/2017 | Lokshin et al. | H04N 21/8547 |
| 2017/0200068 A1 | 7/2017 | Cohen et al. | G06K 9/6857 |
| 2017/0206648 A1 | 7/2017 | Marra et al. | G06T 7/0004 |
| 2017/0293800 A1 | 10/2017 | Babenko et al. | G06K 9/00637 |
| 2018/0150962 A1 | 5/2018 | Fletcher et al. | G06T 7/35 |
| 2018/0218533 A1 | 8/2018 | Millin et al. | G06T 17/05 |
| 2019/0346842 A1* | 11/2019 | Bye et al. | G05D 1/0038 |

OTHER PUBLICATIONS

Elbogen, "Enhancing Field Adjuster Productivity with Annotations and Site Photos," accessed from https://kespry.com/blog/enhancing-field-adjuster-productivity-with-annotations-and-site-photos, Oct. 18, 2017, 22 pp.

Solbrig et al., "Online Annotation of Airborne Surveillance and Reconnaissance Videos," FOM—Research Institue for Optronics and Pattern Recognition FGAN—Research Establishment for Applied Science Ettlingen, Germany, Sep. 2008, pp. 1131-1138.

U.S. Appl. No. 15/977,624, by Charles T. Bye et al., filed May 11, 2018.

U.S. Appl. No. 15/849,302, by Robert E. De Mars et al., filed Dec. 20, 2017.

Shakhnarovich, "Chapter 6: Learning Image Patch Similarity," Learning Task-Specific Similarity, Massachusetts Institute of Technology, Sep. 2005, 18 pp.

* cited by examiner

APPLYING AN ANNOTATION TO AN IMAGE BASED ON KEYPOINTS

TECHNICAL FIELD

This disclosure relates to image processing.

BACKGROUND

Vehicles such as unmanned aerial vehicles (UAVs) have the potential to dramatically improve the process of inspecting various inspection targets, such as bridges, electrical transmission towers, agricultural fields, buildings, antennas, and so on. For instance, a UAV may be able to access areas that would be difficult for a person to access, such as the lower surfaces of bridges, or areas close to electrical transmission towers where it would be difficult to safely fly manned aerial vehicles.

A remote camera, such as a remote camera onboard a vehicle, may be configured to capture and transmit real-time image data through a communication channel to a computing device. For example, a user (e.g., a building inspector) may use a remote camera, such as a camera on a UAV, to inspect infrastructure like a bridge or a building. The inspector may use a computing device such as a laptop, tablet, mobile phone, etc. for controlling the UAV, capturing images or video taken by the UAV, and for annotating the images or video with electronic notes that document the inspection.

Some remote cameras are configured to locally store high-resolution images and transmit a low-resolution version of the high-resolution images in real-time. Another remote camera may be configured to transmit a subset of the high-resolution images in real-time and transmit the full set of images at a later time. Although the computing device is able to receive and process, in near real-time, the low-resolution version or the subset of the high-resolution images, the computing device must wait until it is in proximity with the remote camera to download all of the locally stored high-resolution images. Accordingly, any annotations or electronic notes taken on the computing device relating to the low-resolution version or the subset of images must be manually applied at a later time to the high-resolution images.

SUMMARY

In general, this disclosure relates to systems, devices, and techniques for applying annotations from a first image to a second image based on a set of keypoints and an image patch. To apply an annotation from the first image to the second image, processing circuitry can determine an image patch in the first image that overlaps with the annotation. The processing circuitry may be configured to determine an image patch in the second image that corresponds to the image patch in the first image based on matching a set of keypoints in the image patch in the first image to a set of keypoints in the corresponding image patch in the second image. The processing circuitry can apply the annotation to the second image based on the position of the corresponding image patch in the second image.

In some examples, a computing device includes a display, processing circuitry configured to present a first image via the display, and an input device configured to receive user inputs. The processing circuitry is further configured to determine an annotation to the first image based on the user inputs and determine an image patch in the first image overlapping with the annotation. The processing circuitry is also configured to determine, in the image patch in the first image, a first set of keypoints associated with the annotation. The processing circuitry is configured to match the first set of keypoints in the image patch in the first image to a second set of keypoints in the corresponding image patch in the second image and determine a position of the corresponding image patch in the second image based on matching the first set of keypoints to the second set of keypoints. The processing circuitry is further configured to apply the annotation to the second image based on the position of the corresponding image patch in the second image.

In some examples, a method includes receiving, by a computing device, a first image and a second image and receiving, by an input device of the computing device, user inputs. The method also includes determining, by processing circuitry of the computing device, an annotation to the first image based on the user inputs. The method includes determining, by the processing circuitry, an image patch in the first image overlapping with the annotation. The method further includes determining, by the processing circuitry, a first set of keypoints in the image patch in the first image, the first set of keypoints being associated with the annotation. The method also includes determining, by the processing circuitry, a position of a corresponding image patch in the second image. The method further includes matching, by the processing circuitry, the first set of keypoints on the image patch in the first image to a second set of keypoints in the corresponding image patch in the second image. The method includes applying, by the processing circuitry, the annotation to the second image based on the position of the corresponding image patch in the second image.

In some examples, device comprising a computer-readable medium having executable instructions stored thereon, configured to be executable by processing circuitry for causing the processing circuitry to present a first image via a display, determine an annotation to the first image based on the user inputs and determine an image patch in the first image overlapping with the annotation, determine, in the image patch in the first image, a first set of keypoints associated with the annotation, match the first set of keypoints in the image patch in the first image to a second set of keypoints in the corresponding image patch in the second image, determine a position of the corresponding image patch in the second image based on matching the first set of keypoints to the second set of keypoints, and apply the annotation to the second image based on the position of the corresponding image patch in the second image.

The details of one or more examples of the disclosure are set forth in the accompanying drawings and the description below. Other features, objects, and advantages will be apparent from the description, drawings, and claims.

DETAILED DESCRIPTION

Figure 1:
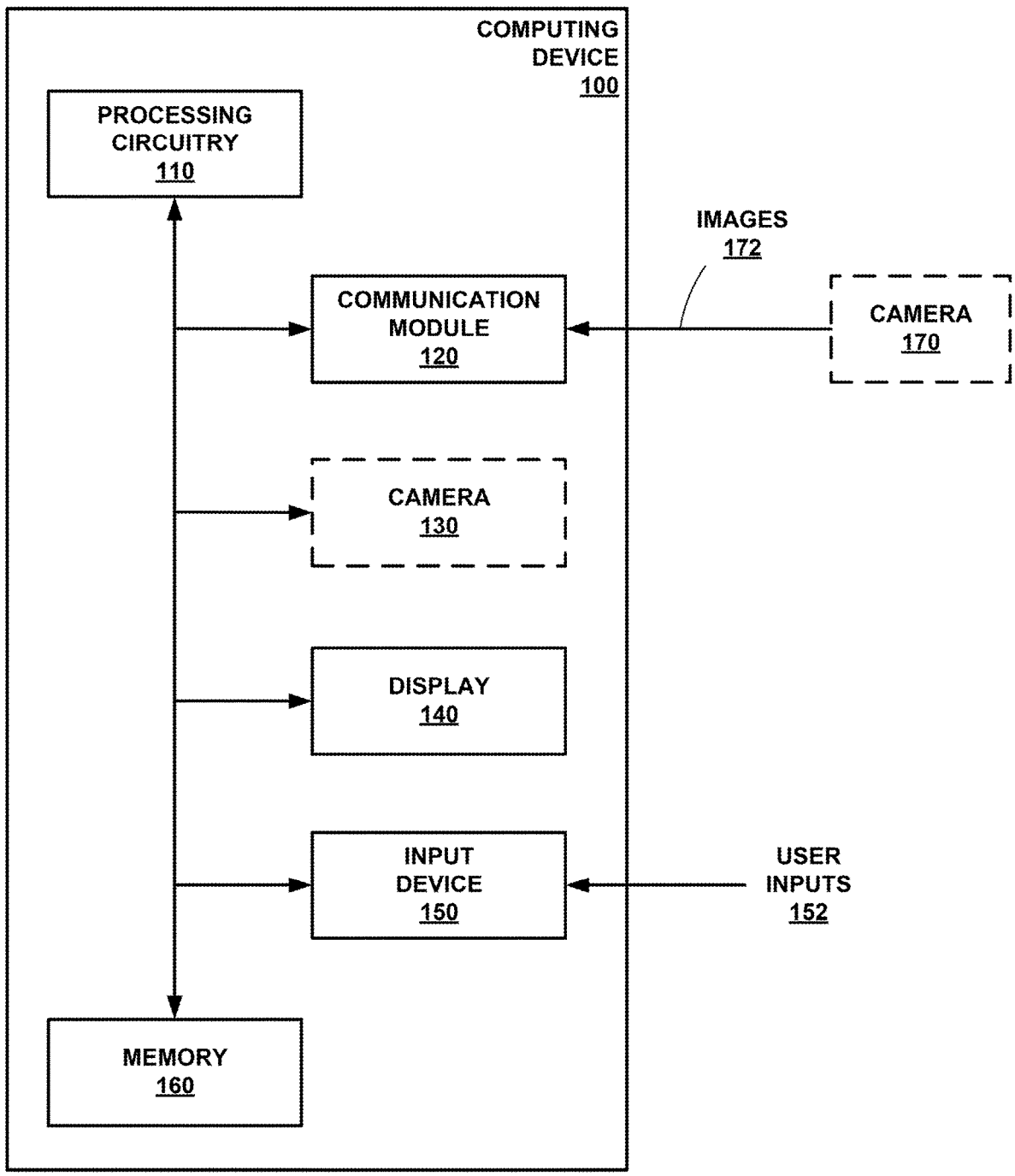
FIG. 1 is a conceptual block diagram of an example computing device configured to apply an annotation from a first image to a second image, in accordance with some examples of this disclosure.

Various examples are described below that enable computing devices or computing systems to automatically apply annotations from a first image to a second image based on image patches in the two images. Processing circuitry of a computing device can transfer the annotation from the first image to the second image by matching keypoints in the two image patches. The image patch in the first image and the corresponding image patch in the second image are not necessarily the same in all image pairs. Sometimes, a user may create an annotation on an object (e.g., a steel beam on a bridge) depicted in a first image. The second image may depict the same object as the first image, but at a different zoom, angle, orientation, position, or light intensity. Thus, the corresponding image patch in the second image may not be the same as the image patch in the first image because each image may have a different version of the image patch. The keypoints in the corresponding image patch in the second image may not have the same arrangement or spacing as the keypoints in the image patch in the first image. By matching keypoints in the image patches, the processing circuitry may be able to apply the annotation to the second image without any user intervention.

In some examples, processing circuitry of a computing device may be configured to use the techniques of this disclosure to automatically apply annotations from a low-resolution image to a high-resolution image. For example, a computing device may receive a low-resolution image from a remote camera via a wireless communication channel in near real-time as the camera captures the image. The wireless communication channel may have less capacity than a wired or local communication channel from which the computing device later receives a high-resolution version of the image captured by the remote camera.

For example, a UAV inspecting infrastructure can be equipped with one or more high-resolution cameras, but the UAV may not be able to transfer the high-resolution images to a remote ground station in real time. As a result, the UAV may transmit low-resolution images to the remote ground station and locally store the high-resolution images on the UAV platform. There may be differences between low-resolution images and high-resolution images taken by a UAV in an inspection. Those differences may be caused by small changes in position, the orientation of camera, or small changes in light intensity.

An inspector observing this live feed of low-resolution images may annotate the images with some graphics or text. When the UAV returns to the ground station, the inspector may use the high-resolution images for the inspection report instead of the low-resolution images, which may include annotations. Processing circuitry of this disclosure may be configured to transfer the annotations made by inspector on the low-resolution images to the high-resolution images without any loss of details, including the location of the annotation in the corresponding images. The techniques of this disclosure can address this issue using unique image features (e.g., keypoints) of the annotated object to locate it in other image(s) and find the scaling information of located object.

The processing circuitry may be configured to automatically apply an annotation from a first image to a second image, where the second image has a different zoom, angle, orientation, or position than the first image. In examples in which the second image has a different zoom, angle, orientation, or position than the first image, the second image may contain an image patch that corresponds to the image patch in the first image. The corresponding image patch in the second image may have different pixel dimensions than the image patch in the first image because of the different angle, zoom, or orientation of the second image. For example, the image patch in the first image may include a top-down view of a building, and the corresponding image patch in the second image may include a slightly orientation or angle (e.g., not exactly a top-down view). Using the techniques of this disclosure, processing circuitry may be capable of matching keypoints in the two image patches, even though the pixels in the two image patches are arranged differently.

FIG. 1 is a conceptual block diagram of an example computing device 100 configured to apply an annotation from a first image to a second image, in accordance with some examples of this disclosure. FIG. 1 depicts computing device 100 as including camera 130 and/or communicatively coupled via a link to receive images 172 from remote camera 170. Computing device 100 includes display 140, communication module 120, input device 150 that is configured to receive user inputs 152, and processing circuitry 110. Computing device 100 may include a smartphone, a tablet, a laptop computer, a desktop computer, or a server.

Computing device 100 may include or is part of a general-purpose device such as a personal digital assistant (PDA), a laptop or desktop computer, a tablet computer, a cellular or satellite radio telephone, a mobile device such as a mobile phone (e.g., a smartphone), and/or another such device. In examples where computing device 100 is a general-purpose device, computing device 100 (e.g., memory 160) may be loaded with and configured to execute software designed to receive images from camera 130 and 170, present images via display 140, and receive user inputs 152 via input device 150. The software stored to memory 160, when executed, may cause processing circuitry 110 to determine an annotation to a first image based on user inputs 152 and apply the annotation to a second image.

In other examples, computing device 100 is a special-purpose device designed specifically for use in controlling cameras 130 and 170, presenting images via display 140, and receiving user inputs 152. In some examples, computing device 100 includes a flight control and navigation system for controlling the movements of a vehicle on which camera 170 is mounted. Computing device 100 may include a handheld device and/or be a part of a ground control base station.

Processing circuitry 110, as well as other processors, processing circuitry, controllers, control circuitry, and the like, described herein, may include one or more processors. Processing circuitry 110 may include any combination of integrated circuitry, discrete logic circuitry, analog circuitry, such as one or more microprocessors, digital signal processors (DSPs), application specific integrated circuits (ASICs), or field-programmable gate arrays (FPGAs). In some examples, processing circuitry 110 may include multiple components, such as any combination of one or more microprocessors, one or more DSPs, one or more ASICs, or one or more FPGAs, as well as other discrete or integrated logic circuitry, and/or analog circuitry.

Communication module 120 may be configured to communicate with remote camera 170 by receiving images 172 from remote camera 170. In addition, communication module 120 may be configured to transmit control signals to remote camera 170. In some examples, the link(s) between communication module 120 and remote camera 170 may be a network-based link including one or more intermediary devices such as gateways, routers, switches, repeaters, or other such network devices. The communication link between communication module 120 and remote camera 170 may include multiple transmission mediums, including the use of cloud servers and other databases. Communication module 120 may include any wired connection or wireless connection with remote camera 170. For example, a wired connection may include an ethernet connection, a coaxial cable, universal serial bus (USB), RS-232, and/or any other suitable protocol. A wireless connection may include Wi-Fi, Bluetooth, radio frequency wireless, ZigBee, a proprietary protocol, and/or any other suitable protocol. Communication module 120 may include a mobile storage device, such as a thumb drive, an SD card, or an external storage device (e.g., solid state memory or a hard drive).

In some examples, communication module 120 receives a first image from remote camera 170 by a low-capacity communication channel such as a wireless communication channel. Communication module 120 may later receive a second image from remote camera 170 by a high-capacity communication channel. The second image may include a higher resolution version of the first image such that the second image has a larger file size.

Camera 130 can be onboard computing device 100 and/or integrated into computing device 100. In some examples, computing device 100 includes camera 130 in addition to or as an alternative to communication module 120 and remote camera 170. Cameras 130 and 170 may be configured to capture images such as visible photographs, thermal photographs, or video. Cameras 130 and 170 may capture images in inspections of various types of inspection targets such as a building, a dam, a solar panel array, a wind turbine, a monument, a bridge, a levee, a seawall, a pier, an antenna, a volcano, a pump station, an agricultural area, an electrical transmission tower, or another type of artificial or natural structure.

Display 140 may be configured to present images captured by cameras 130 and 170 to a user of computing device 100. For example, display 140 may include a visual presentation of video data or image data. In addition, display 140 may also present annotations determined by processing circuitry 110. Display 140 may include a monitor, cathode ray tube display, a flat panel display such as a liquid crystal (LCD) display, a plasma display, a light emitting diode (LED) display, and/or any other suitable display. Display 140 may be part of a personal digital assistant, mobile phone, tablet computer, laptop computer, any other suitable computing device, or any combination thereof, with a built-in display or a separate display. Computing device 100 may also include means for projecting audio to a user, such as a speaker.

Input device 150 may be configured to receive user inputs 152 for annotating images presented by display 140. Input device 150 may include a physical interface and/or a digital interface. A physical input device may include, for example, a touchscreen, touchpad, joystick, button, lever, trigger, steering wheel, mouse, keyboard, and/or other input device. In some examples, input device 150 includes a virtual input device such as a screen displaying any number of digital structures, such as a button, slider, menu item, or other digital structure.

User inputs 152 may include markings on images and video or associations between segments of an image and locations (e.g., associating an image with a location on a bridge). User inputs 152 may include markings, highlights, text, levels of zoom, lines, arrows, circles and/or any other annotations on images presented by display 140. User inputs 152 may include text, highlighting, drawings, and/or voice notes. User inputs 152 may also include metadata such as text, filenames, or notes. User inputs 152 can include touchscreen inputs, keyboard/keypad inputs, mouse inputs, voice/audio inputs, etc.

Processing circuitry 110 may be configured to present a first image via display 140 and determine an annotation to the first image based on user inputs 152 received via input device 150. The user of computing device 100 may create the annotation while the user views the first image presented on display 140. The annotation may include a mark, highlight, text, scribble, or drawing on the first image, and processing circuitry 110 may determine and save the position of the annotation on the first image. Additionally or alternatively, the annotation may include text or metadata associated with the first image. The annotation can indicate a location for additional images to capture during an inspection (see, e.g., FIGS. 2A-2F).

Processing circuitry 110 may be further configured to determine an image patch in the first image that overlaps with the annotation. The image patch can contain all of the annotation area in the first image, as well as additional space on the first image. For example, if a circular annotation covers an area of one hundred pixels, then the corresponding image patch should have at least the one hundred pixels with approximately the same pixel coordinates as the one hundred pixels from the annotation patch. In other words, the corresponding image patch has approximately the same relative location and shape as the image patch from the first image. Depending on the resolutions of the first image and the corresponding image, however, the image patch of the first image and the corresponding image patch may include different numbers of pixels.

The image patch may be a region, subset, or segment (e.g., a set of pixels) of the first image that is approximately centered on a centroid of the annotation. The image patch may have a circular shape, a rectangular shape, an elliptical shape, a polygon shape, and/or any other shape. Processing circuitry 110 can identify the image patch such that the image patch is approximately centered on a centroid of an annotation. "Approximately centered" can mean that a distance between the centroid of the image patch and a centroid of the annotation is less than a threshold distance, such a percentage of the diagonal dimension of the first image, such one, two, three, five, or ten percent of the diagonal dimension of the first image. Processing circuitry 110 can determine the position, dimensions, and boundaries of the image patch based on the dimensions of the annotation. Processing circuitry 110 can associate an object such as an image patch or an annotation with the centroid of the object and/or a corner of the object. For example, processing circuitry 110 can associate an object with the top-left-most point in the object.

Processing circuitry 110 may be configured to store the annotation and the image patch to memory 160 and later transfer the annotation to the second image based on a position of a corresponding image patch in the second image. Processing circuitry 110 may store the annotation and the image patch as part of the first image or in a separate file. For example, processing circuitry 110 can store the annotation and the image patch in separate image files (e.g., a bitmap file) or in an Extensible Markup Language (XML) file that are associated with the first image. Processing circuitry 110 may be configured to store the image patch and the annotation in the same folder as the first image or in a folder with the same name as the filename of the first image. In some examples, the annotation and the image patch may be stored in text files or any other suitable file format. To automatically apply the annotation to the second image, processing circuitry 110 may be configured to associate the separate annotation file with the second image. Additionally or alternatively, processing circuitry 110 may be configured to apply the separate annotation file as a separate layer to the second image.

Processing circuitry 110 may be configured to determine image features (also called keypoints) to locate the annotated object in the first image and transfer the annotation to a second image. The keypoints can be invariant to small changes in position, orientation, zoom, or light intensity. Thus, processing circuitry 110 can identify the annotated object in the second image despite the differences between the two images. Processing circuitry 110 may be configured to identify the annotated object in the second image when the annotated object is only partially visible in the second image. In examples in which the image patch is less than fully visible in the second image, processing circuitry 110 may be configured to match fewer than all of the first set of keypoints to the second set of keypoints in the second image.

Processing circuitry 110 may be configured to determine a set of keypoints in the image patch in the first image. The keypoints in an image may be unique image features in the images, such as edges of objects, corners of objects, and changes in color, light, or brightness across adjacent or proximate pixels. For example, processing circuitry 110 can detect a keypoint where there is a high variance in color, light, or brightness across adjacent or proximate pixels. The set of keypoint may include a block of pixels, where each keypoint includes a single pixel or a group of adjacent pixels. Processing circuitry 110 can use a keypoint detection method to determine each keypoint, where the keypoint detection method includes an edge detection algorithm, a corner detection algorithm, a speeded up robust features (SURF) feature descriptor, a scale-invariant feature transform (SIFT) feature descriptor, a Laplacian detection algorithm, a Hessian detection algorithm, a Harris detection algorithm, a features from accelerated segment test (FAST) detection algorithm, an oriented FAST and rotated binary robust independent elementary feature (ORB) descriptor, and/or any other suitable keypoint detection method. The keypoint detection method may not need machine learning to identify and match keypoints across multiple images. For keypoint matching, processing circuitry 110 can use Euclidian distance based matching, bag of words technique, random sample consensus (RANSAC) with affine model, RANSAC with homography, and/or any other keypoint matching algorithm. Processing circuitry 110 may be configured to store the positions of the keypoints to the image patch file or to a separate file specifically for the keypoint positions.

Processing circuitry 110 may be configured to select the second image from a set of images by determining that the second image includes an image patch that corresponds to the image patch in the first image. For example, processing circuitry 110 can search through the set of images to identify images that include a corresponding image patch before applying the annotation to the selected images. Additionally or alternatively, processing circuitry 110 may be configured to select the second image based on the time, location, or orientation of capture of the first image and the second image. For example, processing circuitry 110 can select images from a set of images, where the selected images have a time of capture differing from the time of capture of the first image by less than a threshold time duration. Computing device 100 may be configured to select a second image based on the time stamps for the images to find overlap between the first image and a second image. In examples in which the time stamps are within a threshold duration of time, processing circuitry 110 may determine that the segments are versions of the same image or that there is a high probability for overlap. The threshold duration of time may be less than two seconds, one second, or five hundred milliseconds.

Processing circuitry 110 may be configured to determine a set of keypoints in the corresponding image patch in the second image. In some examples, processing circuitry 110 is configured to use a keypoint detection method to determine a set of possible keypoints in the second image. The set of possible keypoints may include all of the possible keypoints in the second image including the second set of keypoints. Processing circuitry 110 may be configured to match the set of keypoints in the image patch in the first image to a set of keypoints in the second image. Processing circuitry 110 may be configured to determine the second image includes an image patch corresponding to the image patch in the first image based on the set of possible keypoints in the second image.

To apply the annotation to the second image, processing circuitry 110 may be configured to determine a scaling factor between the image patch in the first image and the image patch in the second image. Processing circuitry 110 can determine a scaling factor for a vertical dimension, a scaling factor for a horizontal dimension, and one or more skew factors in examples in which the scaling is not constant across both image patches. Processing circuitry 110 can determine the horizontal scaling factor based on a ratio of the average horizontal distance for the first set of keypoints and the average horizontal distance for the second set of keypoints. Processing circuitry 110 may be configured to interpolate, stretch, and/or compress the annotation from the first image based on matching the keypoints in the two images and the position of the corresponding image patch in the second image.

Example details of determining scaling factors and apply annotations can be found in commonly assigned U.S. patent application Ser. No. 15/849,302 filed on Dec. 20, 2017, entitled "Applying Features of Low-Resolution Data to Corresponding High-Resolution Data," and U.S. patent application Ser. No. 15/977,624 filed on May 11, 2018, entitled "Transferring Annotations to Images Captured by Remote Vehicles Between Displays," both of which are incorporated herein by reference in their entirety.

Processing circuitry 110 may automatically apply the annotations to the second image or, before applying the annotation, computing device 100 may be configured to prompt the user for permission to transfer the annotation to the second image. The techniques of this disclosure may reduce user mistakes because computing device 100 may match keypoints in the first image to keypoints in the second image, rather than always applying the annotation to the same position in both images. The transfer or application of the annotation may not require a user to provide user inputs 152 for manually transferring individual annotations from the first image to the second image. Thus, processing circuitry 110 may transfer annotations to the high-resolution version of the image with relatively little effort by the user.

The techniques of this disclosure may solve the problem of a user manually transferring the annotations from a first image to a second image. The automatic transfer of annotations may take less user time, as compared to the manual transfer of annotations. The techniques of this disclosure may solve this problem by allowing a user (e.g., an inspector) to make notes and markings on the first image sent to computing device 100 (e.g., the ground station), in real time during an inspection. Computing device 100 may then automatically synchronize these annotations to the second images when the second image is, e.g., downloaded from the SD card in remote camera 170. The capability of transferring annotations from a first image to a second image (and additional images) without any loss can improve the user experience, especially for image capturing in inspection applications.

Computing device 100 and/or processing circuitry 110 may include any suitable arrangement of hardware, software, firmware, instructions, or any combination thereof, to perform the techniques attributed to computing device 100 and/or processing circuitry 110 herein. Examples of computing device 100 and/or processing circuitry 110 include any one or more microprocessors, digital signal processors (DSPs), application specific integrated circuits (ASICs), field programmable gate arrays (FPGAs), and/or any other equivalent integrated or discrete logic circuitry, as well as any combinations of such components. When computing device 100 and/or processing circuitry 110 includes software or firmware, computing device 100 and/or processing circuitry 110 further includes any necessary hardware for storing and executing the software or firmware, such as one or more processors or processing units. In some examples, computing device 100 and/or processing circuitry 110 may include one or more processors or processing cores.

In general, a processing unit may include one or more microprocessors, DSPs, ASICs, FPGAs, or any other equivalent integrated or discrete logic circuitry, as well as any combinations of such components. Although not shown in FIG. 1, computing device 100 and/or processing circuitry 110 may include a memory device and/or a computer-readable storage medium configured to store data. The memory device may include any volatile or non-volatile media, such as a random access memory (RAM), read only memory (ROM), non-volatile RAM (NVRAM), electrically erasable programmable ROM (EEPROM), flash memory, and the like. In some examples, the memory device may be external to computing device 100 and/or processing circuitry 110 (e.g., may be external to a package in which computing device 100 and/or processing circuitry 110 is housed).

Remote camera 170 may be configured to capture, gather, and transfer data to communication module 120. Remote camera 170 may include a still camera, a video camera, an audio receiver, a position sensor, a temperature sensor, a pressure sensor, an accelerometer, and/or any other conceivable remote sensor. In some examples, remote camera 170 may be mounted on a vehicle such as an aircraft, land vehicle, marine vehicle, UAV, autonomous vehicle, and/or drone. Remote camera 170 may be mounted in a fixed location such as a security camera, a nature camera, etc. In some examples, computing device 100 is capable of controlling the operation of remote camera 170 via communication module 120.

Remote camera 170 may be configured to transmit images 172 to communication module 120 through a communication channel. Remote camera 170 may capture images 172. In some examples, remote camera 170 may transmit low-resolution versions of images 172 through a wireless communication channel with low throughput in near real-time. To converse communication resources, remote camera 170 may transmit less than all of images 172 in near real-time.

When a higher-capacity communication channel becomes available, remote camera 170 may transfer high-resolution versions of images 172 to computing device 100. Remote camera 170 may include processor configured to store high-resolution versions of images 172 to a memory device. For example, the processor may be configured to store images 172 to a mobile storage device, such as an external memory device or SD card. The processor may transfer high-resolution versions of images 172 to communication module 120 by a wired connection or the mobile storage device. In some examples, the processor may be configured to transfer high-resolution versions of images 172 via a wireless connection after remote camera 170 has finished capturing images 172 (e.g., after an inspection is finished).

FIGS. 2A-2F illustrate example images depicting an electrical transmission tower 210. For simplicity of presentation, FIGS. 2A-2F depict diagrammatic images, rather than photographs. However, it is contemplated that the techniques of this disclosure can be used on photographic images and thermal images. Image 200A depicts electrical transmission tower 210, which includes legs 212 and 214, beams 216 and 218, and cross arms 220, 222, 224, and 226. Image 200A may be an aerial image and/or a lateral image. The techniques of FIGS. 2A-2F are described with reference to processing circuitry 110 of computing device 100 shown in FIG. 1, although other components may exemplify similar techniques.

Processing circuitry 110 shown in FIG. 1 may be configured to receive image 200A from camera 130 or from camera 170 via communication module 120. Camera 130 or 170 can capture image 200A as part of an inspection of electrical transmission tower 210. In some examples, camera 170 is mounted onboard a UAV that moves around electrical transmission tower 210 to capture images of various portions of electrical transmission tower 210 from various angles and positions. Processing circuitry 110 may be configured to receive and store image 200A to memory 160. Processing circuitry 110 may also be configured to present image 200A to a user via display and receive user inputs 152 from the user via input device 150, where user inputs 152 can indicate annotation 230A shown in FIG. 2B.

Figure 2A:
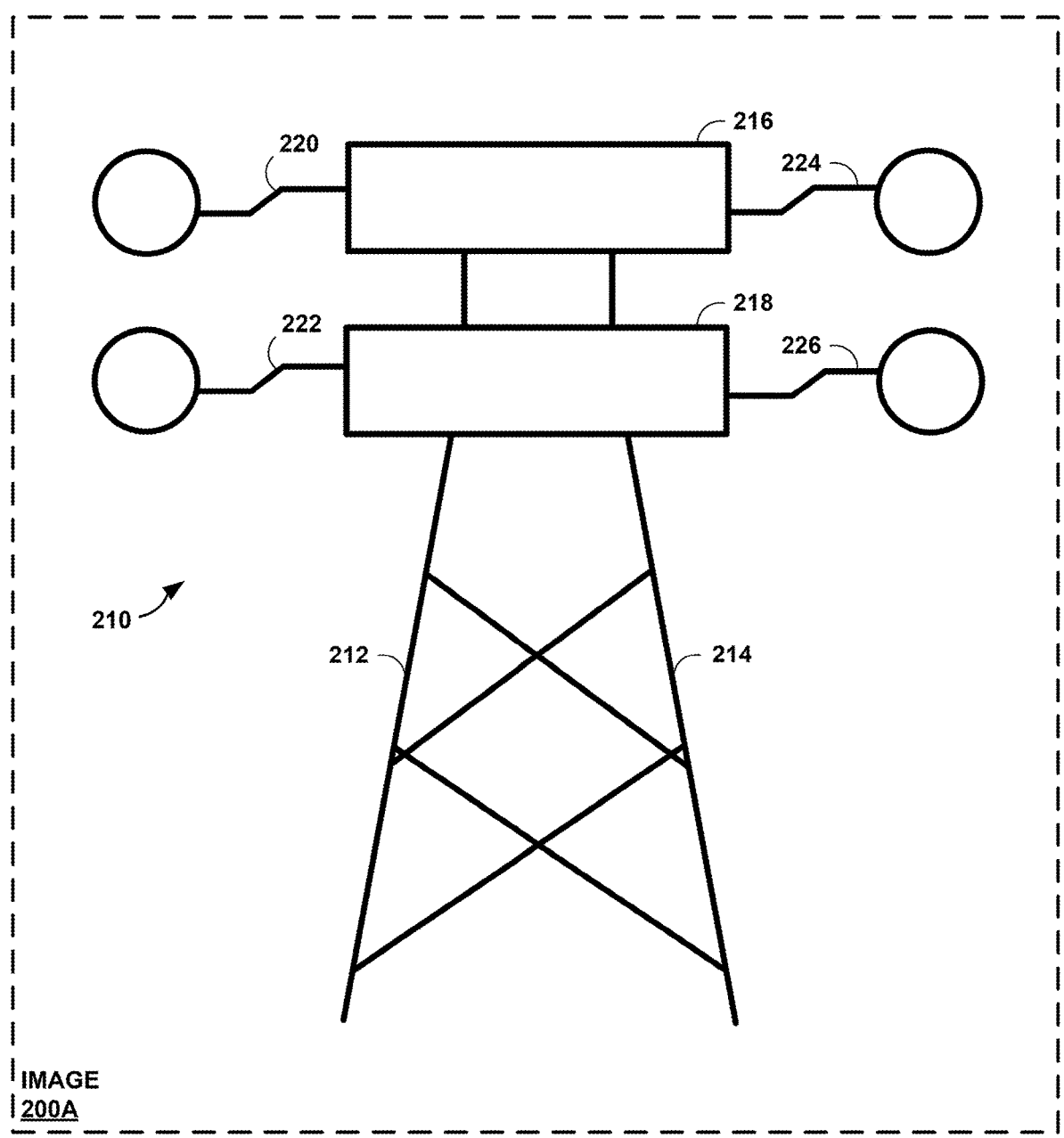
FIGS. 2A-2F illustrate example images depicting an electrical transmission tower.
Figure 2B:
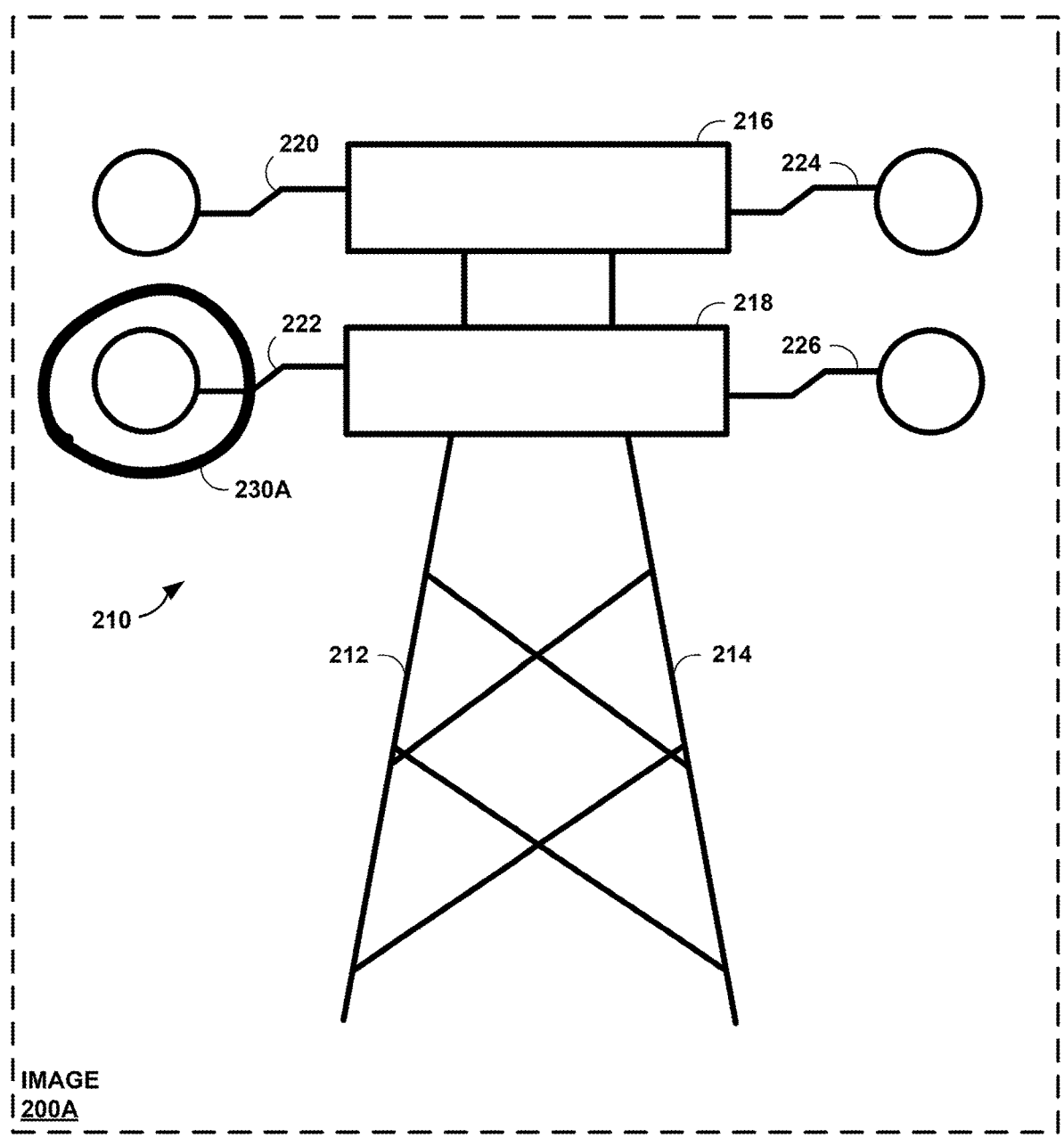

FIG. 2B depicts annotation 230A on image 200A. As shown in FIG. 2B, annotation 230A includes a marking, a graphic shaped in a circle surrounding the end of cross arm 222, which may be referred to as the "annotated object." A user may create annotation 230A by providing user inputs 152 to input device 150. For example, processing circuitry 110 can present image 200A via display 140, which may include a touchscreen. The user can draw a circle around cross arm 222 on the touchscreen with a stylus or the user's finger. Processing circuitry 110 may be configured to store annotation 230A to memory 160 as an image file separate from the file for image 200A.

Figure 2C:
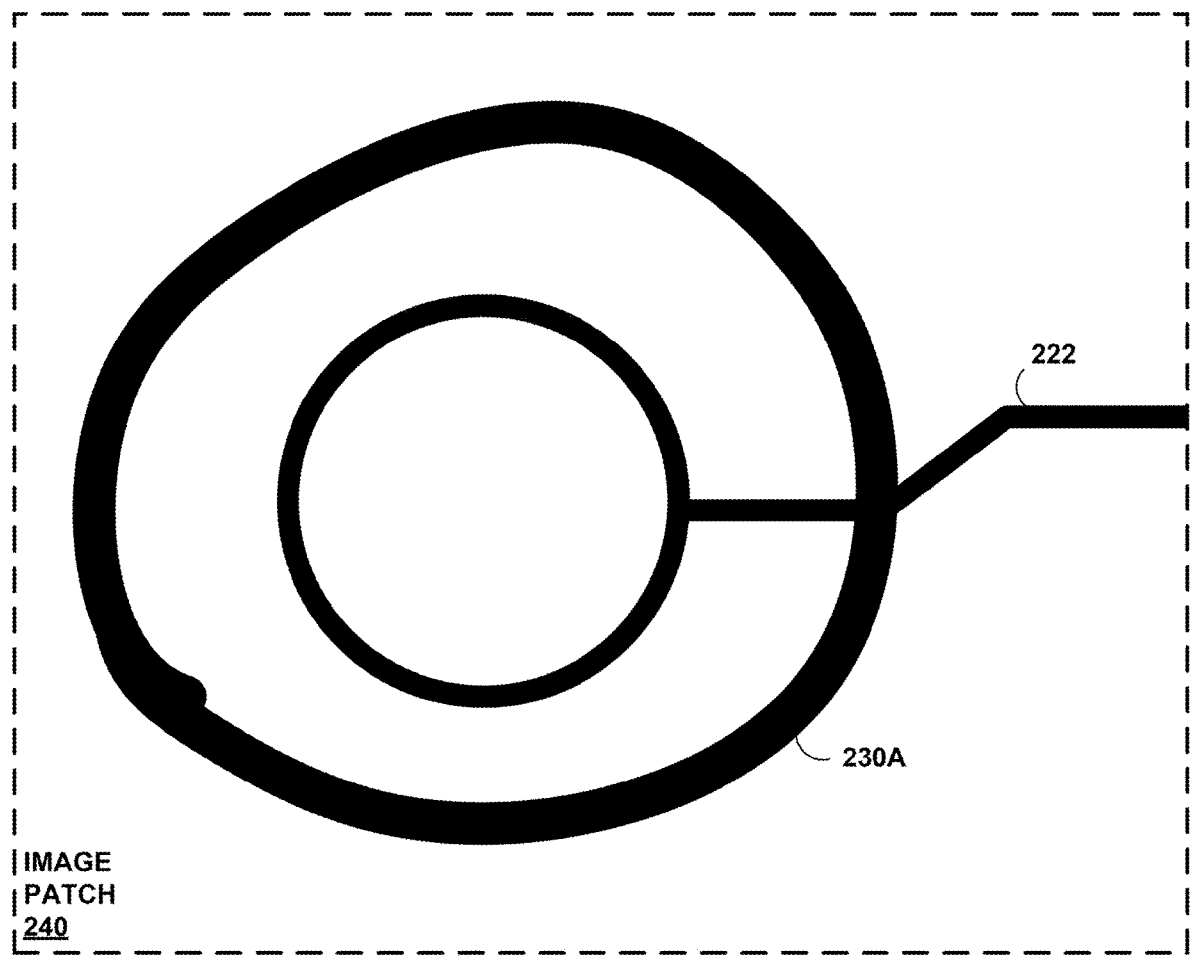

FIG. 2C depicts image patch 240 including annotation 230A and depicts a portion of cross arm 222 of electrical transmission tower 210. Image patch 240 is a portion of image 200A shown in FIGS. 2A and 2B. Image patch 240 may be an upsampled version of a portion of image 200A. FIG. 2C depicts image patch 240 as fully overlapping with annotation 230A, but processing circuitry 110 may be configured to determine an image patch that does not fully overlap with annotation 230A. Image patch 240 may be centered on a centroid of annotation 230A.

Figure 2D:
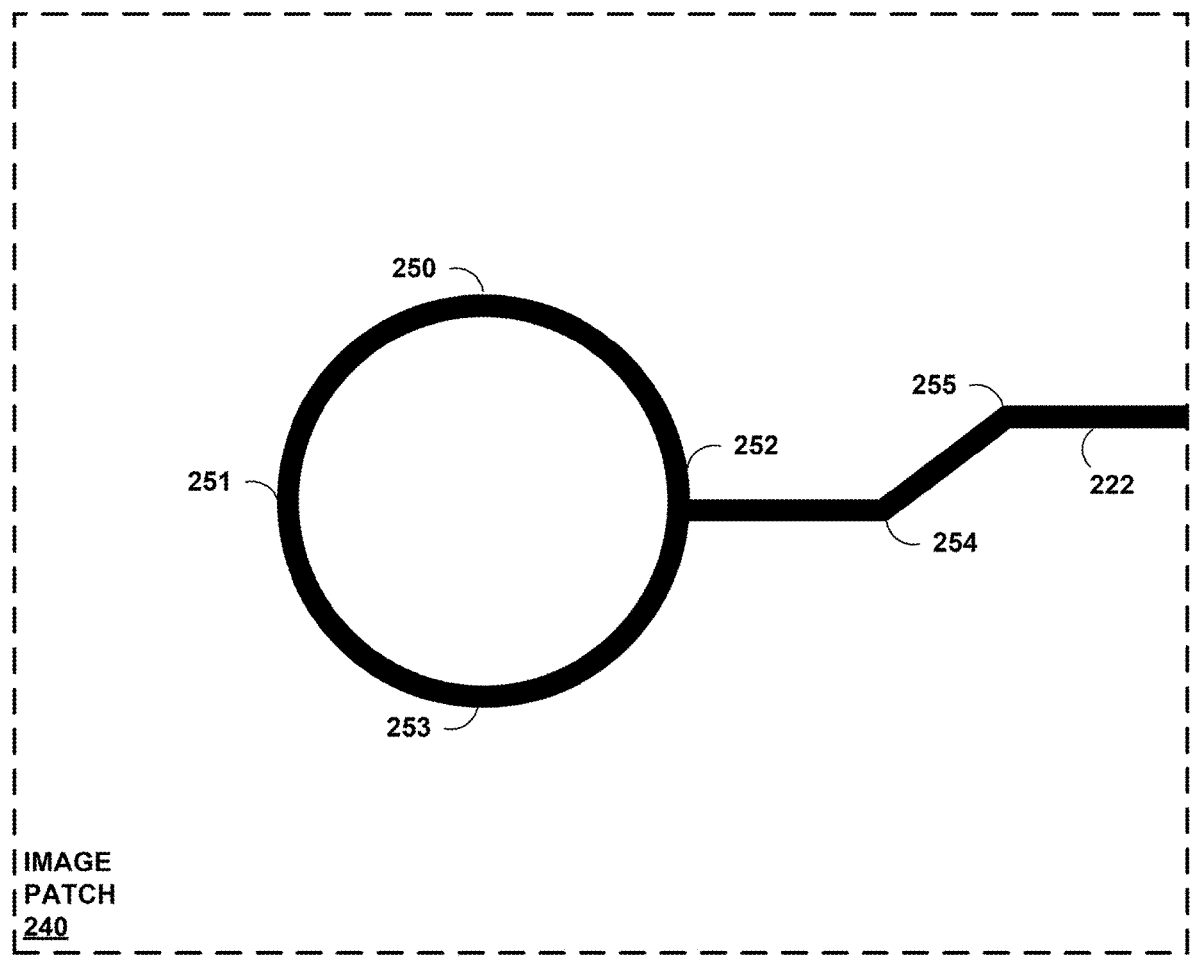

Processing circuitry 110 can determine keypoints 250-255 in image patch 240 based on a keypoint detection method, such as an edge detection algorithm, a corner detection algorithm, and/or an algorithm that detects changes in color or brightness across adjacent pixels in image patch 240. Processing circuitry 110 may be configured to use a keypoint detection method to identify whether absolute differences or standard deviations across a block of pixels are greater than a threshold level. Processing circuitry 110 may be configured to determine a keypoint where the absolute change across adjacent pixels or proximate pixels is greater than a threshold level. In the example of FIG. 2D, processing circuitry 110 may determine keypoints 250-253 as the top, left, right, and bottom points of the circle at the end of cross arm 222. Processing circuitry 110 may also determine keypoints 254 and 255 as bends on cross arm 222.

Figure 2E:
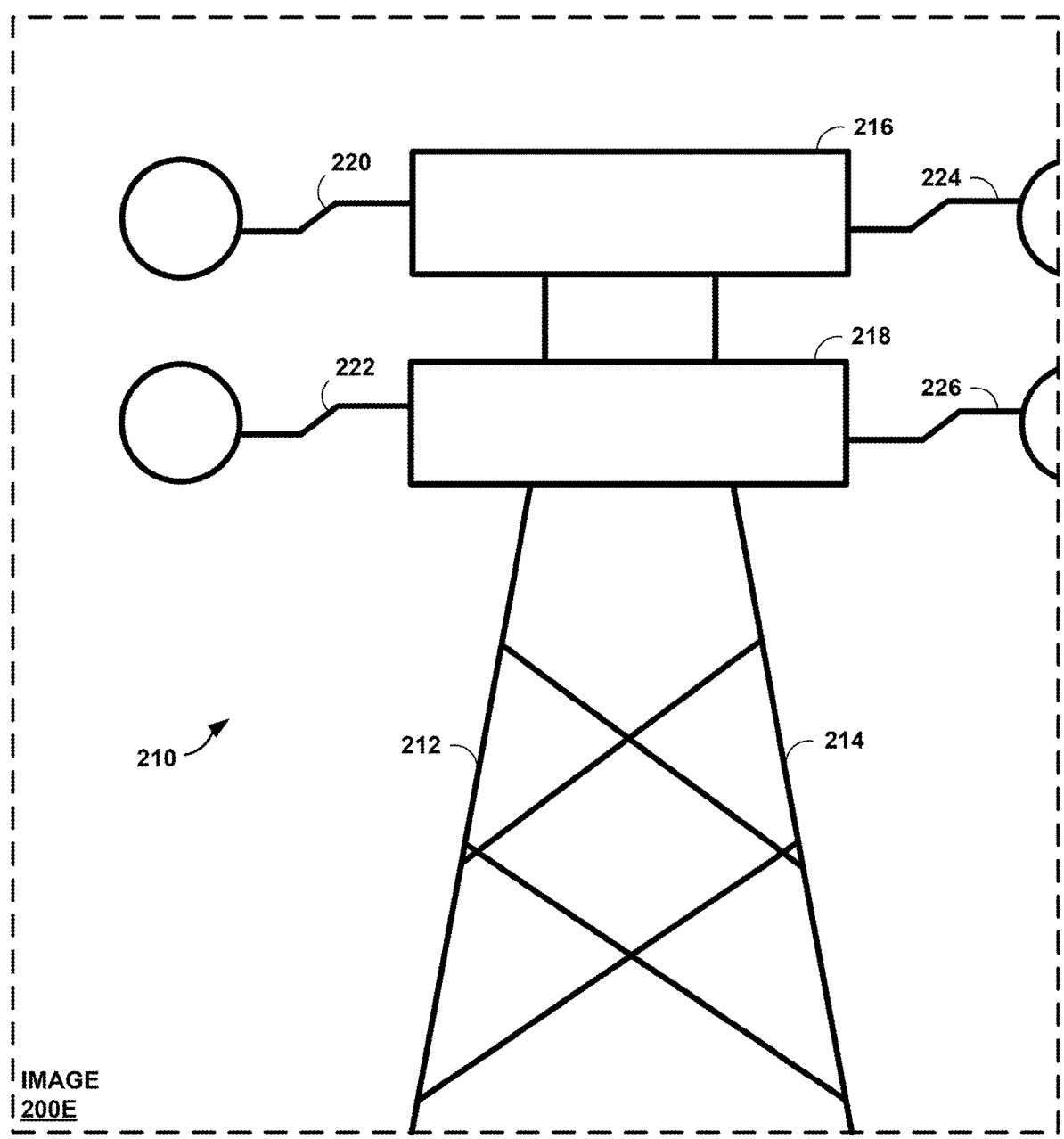
Figure 2F:
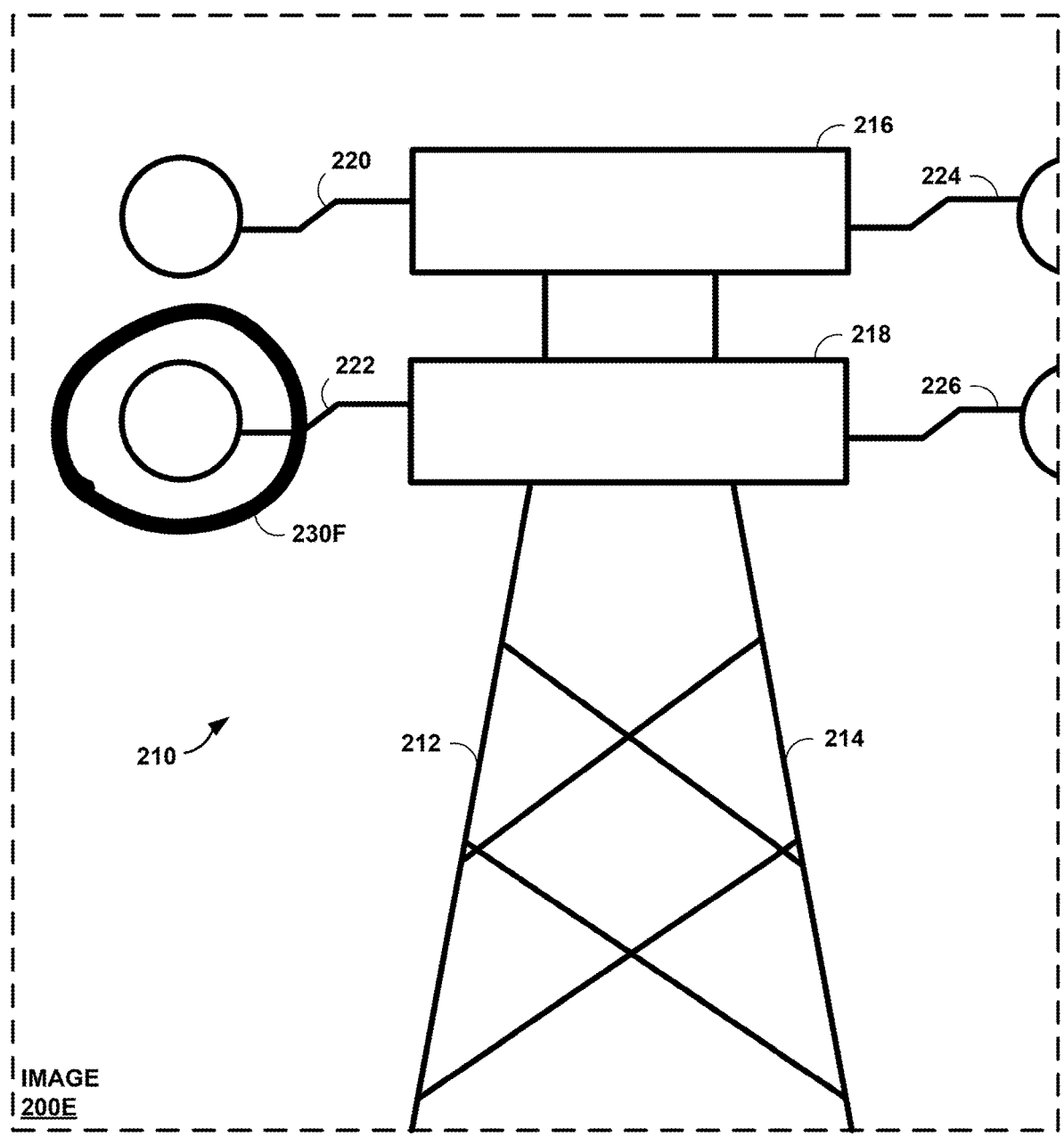

FIG. 2E depicts image 200E, which includes electrical transmission tower 210. Image 200E has a different perspective, angle, zoom, position, and/or orientation than image 200A. Processing circuitry 110 may be configured to select image 200E from a set of images based on finding an image patch corresponding to image patch 240 in image 200E and/or matching keypoints of image 200E to keypoints 250-255 shown in FIG. 2D. In some examples, processing circuitry 110 is configured to select image 200E from a set of images based on the times, positions, and/or angles of capture of images 200A and 200E.

In some examples, processing circuitry 110 is configured to determine a set of possible keypoints in image 200E using the same keypoint detection used for image patch 240. Processing circuitry 110 may be further configured to determine whether image 200E includes an image patch corresponding to image patch 240 based on matching keypoints 250-255 to the set of possible keypoints in image 200E. The positions of the keypoints in image 200A are different than positions of the keypoints in image 200E because the zoom, perspective, and position of images 200A and 200E are different. Processing circuitry 110 may then be configured to determine a position of the corresponding image patch in image 200E based on the positions of the set of possible keypoints in image 200E that match keypoints 250-255.

Processing circuitry 110 may be configured to match keypoints in images 200A and 200E based at least in part by determining that a difference between pixel values of the block of pixels associated with keypoints 250-255 and pixel values of the block of pixels associated with the keypoints in image 200E is less than a threshold level. The threshold level may include a threshold change in color, brightness, or light intensity.

Processing circuitry 110 may be configured to determine a scaling factor for annotation 230A based on the set of possible keypoints in the second image and the first set of keypoints in image patch 240. The scaling factor may include a vertical scaling factor, a horizontal scaling factor, and other scaling factors based on skew, tilt, rotation, and angle of the keypoints. Processing circuitry 110 may create a new image with the same resolution as image 200E and apply annotation 230F to the new image. Annotation 230F may be a scaled version of annotation 230A. Processing circuitry 110 can present image 200E with the new image including annotation 230F laid over image 200E.

Figure 3:
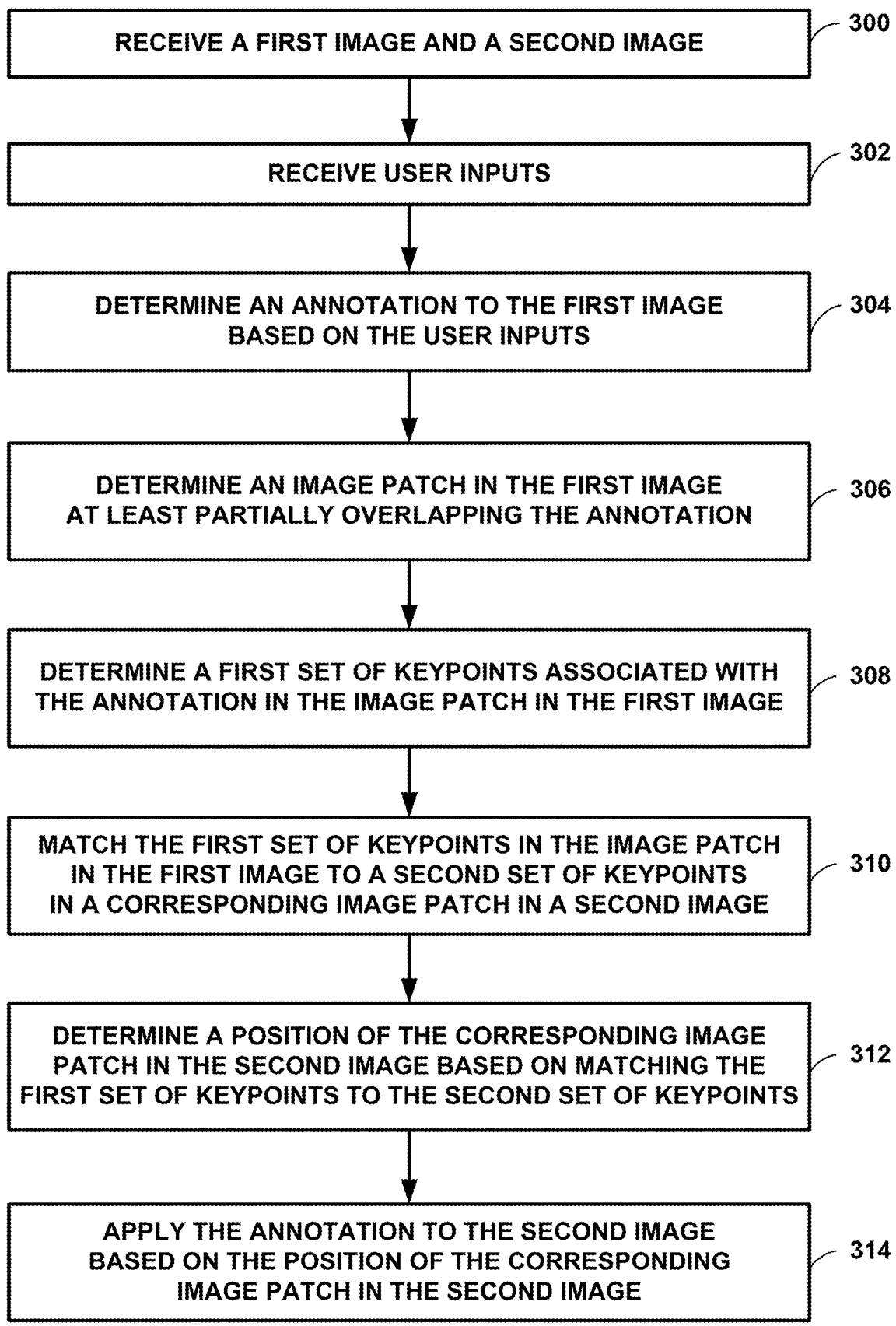
FIGS. 3-5 are flowcharts illustrating example techniques for applying an annotation to an image based on matching a set of keypoints, in accordance with some examples of this disclosure.
Figure 4:
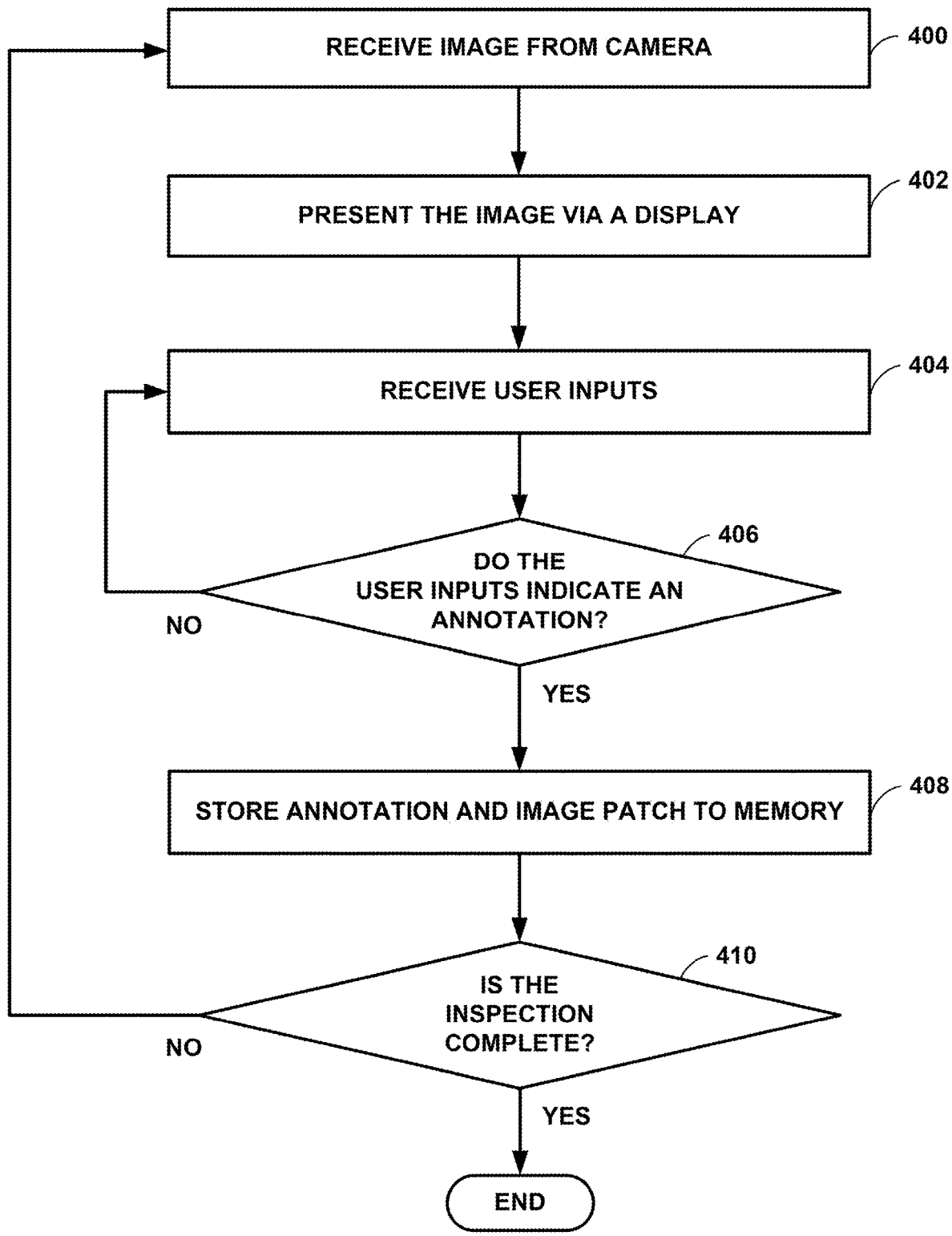
Figure 5:
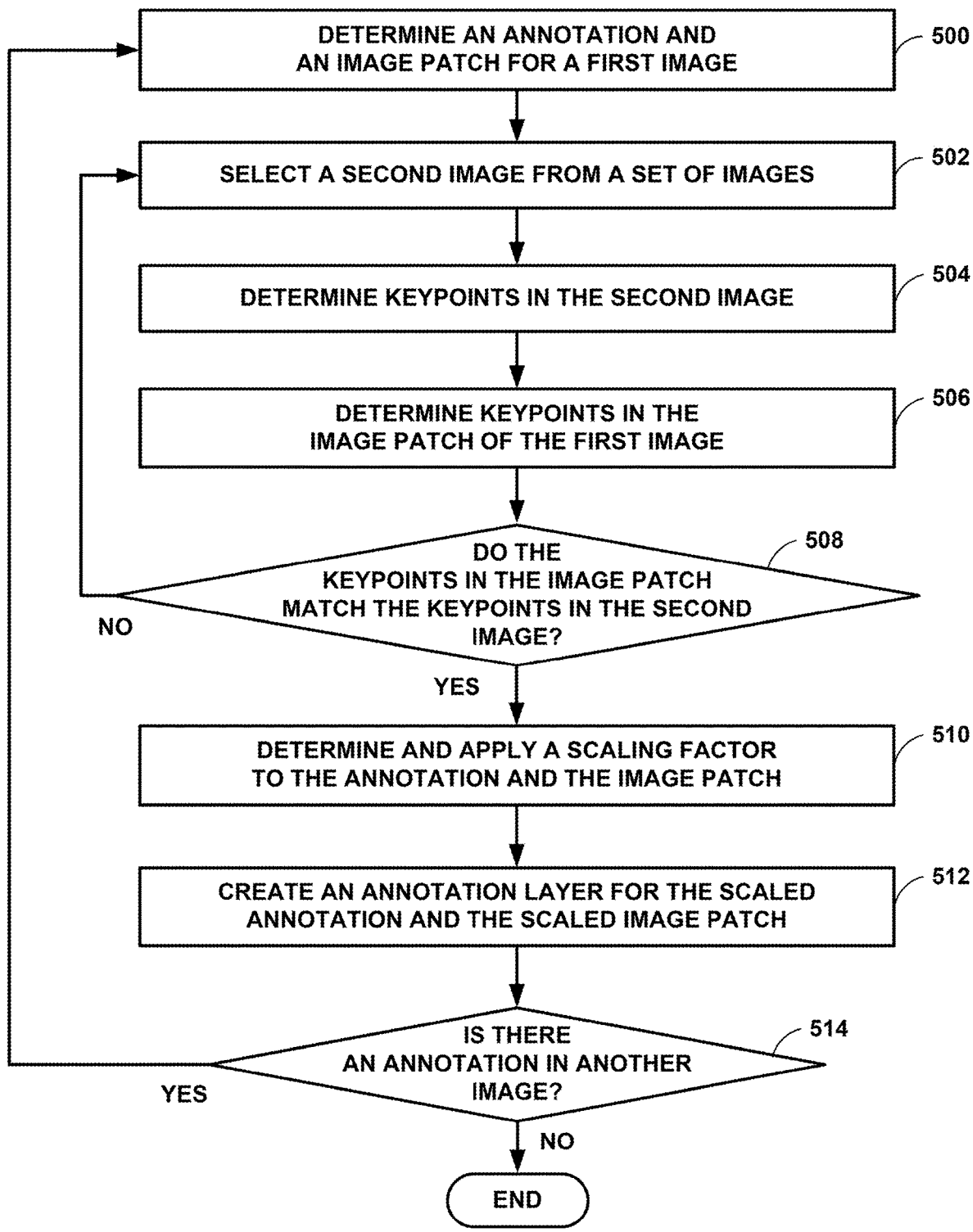

FIGS. 3-5 are flowcharts illustrating example techniques for applying an annotation to an image based on matching a set of keypoints, in accordance with some examples of this disclosure. The techniques of FIGS. 3-5 are described with reference to processing circuitry 110 of computing device 100 shown in FIG. 1, although other components may exemplify similar techniques.

In the example of FIG. 3, processing circuitry 110 receives a first image and a second image from camera 130 or 170 (300). Processing circuitry 110 may be configured to receive the two images at the same time or at different times. Processing circuitry 110 can receive a set of images that includes the first and second images. Processing circuitry 110 also receives user inputs 152 from input device 150 (302). User inputs 152 may indicate an annotation to the first image, such as a mark, graphic, text, and/or highlighting on the first image.

In the example of FIG. 3, processing circuitry 110 determines an annotation to the first image based on user inputs 152 (304). Processing circuitry 110 also determines an image patch in the first image overlapping the annotation (306). Processing circuitry 110 may be configured to store the annotation and the image patch to memory 160 as files that are separate from the file containing the first image.

In the example of FIG. 3, processing circuitry 110 determines a first set of keypoints associated with the annotation in the image patch in the first image (308). Processing circuitry 110 may be configured to use a keypoint detection method to identify unique features of the image patch, such as edges, corners, and/or blocks of pixels with large differences across the respective block. Processing circuitry 110 then matches the first set of keypoints in the image patch in the first image to a second set of keypoints in the corresponding image patch in the second image (310). In some examples, processing circuitry 110 identifies a set of possible keypoints in the second image and matches some or all of these keypoints to the keypoints in the image patch in the first image. Processing circuitry 110 may be configured to determine a scaling factor for the corresponding image based on matching the keypoints.

In the example of FIG. 3, processing circuitry 110 determines a position of a corresponding image patch in the second image (312). The corresponding image patch may not be the same as the image patch in the first image because of different position, dimensions, skew, rotation, and/or light intensity. In some examples, the corresponding image patch may be less than fully visible (e.g., cut off) because of the different views in images 200A and 200E. Processing circuitry 110 then applies the annotation to the second image based on the position of the corresponding image patch in the second image (314). Processing circuitry 110 may apply the annotation to the second image by redrawing or recreating the annotation on the second image. Processing circuitry 110 may also scale, stretch, skew, and/or rotate the annotation when applying the annotation to the second image.

In the example of FIG. 4, processing circuitry 110 receives an image from camera 130 or 170 during an inspection (400). Processing circuitry 110 may receive the image in near real-time as remote camera 170 captures and transmits the image to computing device 100. Processing circuitry 110 presents the image via display 140 (402) and receives user inputs 152 via input device 150 (404). The user can annotate the image to highlight or mark an area on the image. In some examples, the user is an inspector who is communicating to the operator of remote camera 170 about the areas for which the inspector wants more images. The operator may receive the annotated image indicating an area for which the inspector wants more images.

In the example of FIG. 4, processing circuitry 110 determines whether user inputs 152 indicate an annotation (406). In examples in which processing circuitry 110 determines that user inputs 152 do not indicate an annotation, processing circuitry 110 waits to receive additional user inputs 152. In examples in which processing circuitry 110 determines that user inputs 152 indicate an annotation, processing circuitry 110 stores the annotation and an associated image patch to memory 160 (408). The image patch may be a portion of the first image, and the annotation may be the marking, text, graphic, and/or highlighting created based on user inputs 152.

In the example of FIG. 4, processing circuitry 110 determines whether the inspection is complete (410). In examples in which processing circuitry 110 determines that the inspection is not complete, processing circuitry 110 waits to receive an additional image from camera 130 or 170. In examples in which processing circuitry 110 determines that the inspection is complete, processing circuitry 110 can select a second image and apply the annotation to the second image, as described with respect to FIG. 5.

In the example of FIG. 5, processing circuitry 110 determines an annotation and an image patch for a first image (500). Processing circuitry 110 can store the annotation and the image patch to memory 160 as separate files in a folder with the same name as the filename for the first image. Processing circuitry 110 may be configured to determine the vertical and horizontal dimensions of the image patch based on the size of the annotation.

Processing circuitry 110 selects a second image from a set of images (502). In some examples, processing circuitry 110 is configured to select more than one image from the set of images. For example, processing circuitry 110 may be configured to determine each image of the set of images that includes a corresponding image patch. Processing circuitry 110 may be configured to select an image from the set of images at least in part by determining that a difference between a time, location, or orientation of capture for the selected image and the first image is less than a threshold time duration, threshold distance, or threshold level.

In the example of FIG. 5, processing circuitry 110 determines keypoints in the second image (504) and determines keypoints in the image patch of the first image (506). Processing circuitry 110 may be configured to determine a set of possible keypoints in the second image, where the set of possible keypoints may include all possible keypoints. Processing circuitry 110 then determines whether the keypoints in the image patch match the keypoints in the second image (508). Processing circuitry 110 may determine whether the keypoints match based on the quality of matching between each pair of keypoints, where the quality of matching can include keypoint matching techniques such as bag of words technique, RANSAC with affine model, and/or RANSAC with homography.

In examples in which processing circuitry 110 determines that the keypoints in the image patch do not match the keypoints in the second image, processing circuitry 110 selects another image from the set of images (502). In examples in which processing circuitry 110 determines that the keypoints in the image patch match the keypoints in the second image, processing circuitry 110 determines and applies a scaling factor to the annotation and the image patch from the first image (510). Processing circuitry 110 can determine the scaling factor based on the matched keypoints in the two images. Processing circuitry 110 may be configured to determine a scaled version of the annotation based on the scaling factor. Processing circuitry 110 may be further configured to apply the scaled version of the annotation to the second image. Processing circuitry 110 may be configured to determine a position of a corresponding image patch in the second image based on a centroid of the matched keypoints in the second image.

In the example of FIG. 5, processing circuitry 110 creates an annotation layer for the scaled annotation and the scaled image patch (512). In some examples, processing circuitry 110 creates a blank annotation layer with the same resolution as the second image and populates the blank annotation layer with scaled annotation patches. Processing circuitry 110 can use the scaling factor to create the scaled annotation patches, and processing circuitry 110 can position the scaled annotation patches on the blank annotation layer centered on the centroid of the matched keypoints in the second image.

Processing circuitry 110 then determines whether there is an annotation on another image (514). In examples in which processing circuitry 110 determines whether there is an annotation in another image, processing circuitry 110 determines an image patch in the other image (500). In examples in which processing circuitry 110 determines whether there is not an annotation in another image, processing circuitry 110 completes the annotation-transfer process.

Processing circuitry 110 may also be configured to stitch together two or more images to form the second image as a panoramic image. In some examples, processing circuitry 110 can use the first image as one of the images to form the panoramic image. Processing circuitry 110 can apply the annotation to the panoramic image based on the techniques of this disclosure including matching keypoints in first image and the keypoints in the panoramic image. Processing circuitry 110 may also determine a scaling factor and apply the scaling factor to the annotation before applying a scaled version of the annotation to the panoramic image.

Processing circuitry 110 may also be configured to build a three-dimensional model based on two or more images, where one of the two or more images includes an annotation. Processing circuitry 110 may be configured to apply the annotation to the three-dimensional model based on the techniques of this disclosure including matching keypoints in first image and the keypoints in the three-dimensional model.

The following numbered examples demonstrate one or more aspects of the disclosure.

Example 1

A computing device includes a display, processing circuitry configured to present a first image via the display, and an input device configured to receive user inputs. The processing circuitry is further configured to determine an annotation to the first image based on the user inputs and determine an image patch in the first image overlapping with the annotation. The processing circuitry is also configured to determine, in the image patch in the first image, a first set of keypoints associated with the annotation. The processing circuitry is configured to match the first set of keypoints in the image patch in the first image to a second set of keypoints in the corresponding image patch in the second image and determine a position of the corresponding image patch in the second image based on matching the first set of keypoints to the second set of keypoints. The processing circuitry is further configured to apply the annotation to the second image based on the position of the corresponding image patch in the second image.

Example 2

The computing device of example 1, where the processing circuitry is configured to determine the first set of keypoints in the image patch at least in part by determining pixel values of a first block of pixels in the image patch.

Example 3

The computing device of examples 1-2 or any combination thereof, where the processing circuitry is configured to match the first set of keypoints to the second set of keypoints at least in part by determining pixel values of a second block of pixels in the second image that closely matches pixel values of a first block of pixels.

Example 4

The computing device of examples 1-3 or any combination thereof, where the processing circuitry is configured to determine that pixel values of the second block of pixels in the second image closely matches pixel values of the first block of pixels at least in part by determining that a difference between pixel values of the first block of pixels and pixel values of the second block of pixels is less than a threshold level.

Example 5

The computing device of examples 1-4 or any combination thereof, where the processing circuitry is further configured to select the second image based on a time of capture of the second image.

Example 6

The computing device of examples 1-5 or any combination thereof, where the processing circuitry is further configured to determine a set of possible keypoints in the second image using a keypoint detection method and determine the first set of keypoints in the image patch using the keypoint detection method, where the set of possible keypoints includes the second set of keypoints.

Example 7

The computing device of examples 1-6 or any combination thereof, where the processing circuitry is further configured to determine whether the second image includes the corresponding image patch at least in part by matching the first set of keypoints with a set of possible keypoints in the second image and determine the second set of keypoints by matching the first set of keypoints with the set of possible keypoints in the second image.

Example 8

The computing device of examples 1-7 or any combination thereof, where the processing circuitry is further configured to determine a position of the corresponding image patch in the second image based on a centroid of the second set of keypoints in the second image.

Example 9

The computing device of examples 1-8 or any combination thereof, where the processing circuitry is further configured to determine a scaling factor based on a second set of keypoints in the second image and the first set of keypoints in the image patch.

Example 10

The computing device of examples 1-9 or any combination thereof, where the processing circuitry is further configured to create a third image based on the resolution of the second image and apply the annotation to the third image based on the scaling factor and the position of the image patch in the second image.

Example 11

The computing device of examples 1-10 or any combination thereof, where the image patch is centered on a centroid of the annotation.

Example 12

The computing device of examples 1-11 or any combination thereof, where the image patch is less than fully visible in the second image, and the processing circuitry is configured to match the first set of keypoints to the second set of keypoints at least in part by matching fewer than all of the first set of keypoints in the image patch in the first image to the second set of keypoints in the corresponding image patch in the second image.

Example 13

The computing device of examples 1-12 or any combination thereof, where the processing circuitry is further configured to determine a scaling factor based on positions of the first set of keypoints in the first image and positions of the second set of keypoints in the second image. The processing circuitry is configured to apply the annotation to the second image at least in part by determining a scaled version of the annotation based on the scaling factor and applying the scaled version of the annotation to the second image.

Example 14

The computing device of examples 1-13 or any combination thereof, where the processing circuitry is configured to apply the annotation to the second image at least in part by redrawing the annotation of the second image.

Example 15

The computing device of examples 1-14 or any combination thereof, where positions of the first set of keypoints in the first image are different than positions of the second set of keypoints in the second image.

Example 16

The computing device of examples 1-15 or any combination thereof, where the first image includes a low-resolution version of an image, and the second image includes a high-resolution version of an image.

Example 17

The computing device of examples 1-16 or any combination thereof, where an orientation of the first image is different than an orientation of the second image.

Example 18

The computing device of examples 1-17 or any combination thereof, where a zoom of the first image is different than a zoom of the second image.

Example 19

The computing device of examples 1-18 or any combination thereof, where a light intensity of the first image is different than a light intensity of the second image.

Example 20

The computing device of examples 1-19 or any combination thereof, where the processing circuitry is configured to determine the first set of keypoints in the image patch at least in part by determining a set of unique image features in the image patch.

Example 21

The computing device of examples 1-20 or any combination thereof, where the processing circuitry is configured to determine a keypoint of the first set of keypoints at least in part by determining a corner or an edge of an object in the image patch.

Example 22

The computing device of examples 1-21 or any combination thereof, where the processing circuitry is configured to determine a keypoint of the first set of keypoints at least in part by determining that a change in color or brightness across adjacent pixels in the image patch exceeds a threshold level.

Example 23

The computing device of examples 1-22 or any combination thereof, where the processing circuitry is further configured to select the second image from a set of images at least in part by determining whether each image of the set of images includes the image patch.

Example 24

The computing device of examples 1-23 or any combination thereof, where the processing circuitry is configured to apply the annotation to each image of a set of images that includes the image patch.

Example 25

The computing device of examples 1-24 or any combination thereof, where the processing circuitry is further configured to select the second image from a set of images at least in part by determining that a difference between a time of capture for the first image and a time of capture for the second image is less than a threshold time duration.

Example 26

The computing device of examples 1-25 or any combination thereof, where the processing circuitry is further configured to select the second image from a set of images at least in part by determining that a difference between a location of a camera at a time of capture for the first image and a location of the camera at a time of capture for the second image is less than a threshold distance.

Example 27

The computing device of examples 1-26 or any combination thereof, where the processing circuitry is further configured to select the second image from a set of images at least in part by determining that a difference between an orientation of a camera at a time of capture for the first image and an orientation of the camera at a time of capture for the second image is less than a threshold level.

Example 28

The computing device of examples 1-27 or any combination thereof, where the second image includes a panoramic image, and the processing circuitry is further configured to create the second image at least in part by stitching together two or more images.

Example 29

The computing device of examples 1-28 or any combination thereof, further including a communication module configured to receive the first image and the second image from a camera.

Example 30

The computing device of examples 1-29 or any combination thereof, further including a communication module configured to receive the first image and the second image from a camera onboard a vehicle.

Example 31

The computing device of examples 1-30 or any combination thereof, further including a communication module configured to receive the first image and the second image from a camera onboard an autonomous vehicle.

Example 32

The computing device of examples 1-31 or any combination thereof, further including a communication module configured to receive the first image and the second image from a camera onboard an unmanned aerial vehicle.

Example 33

The computing device of examples 1-32 or any combination thereof, where the processing circuitry is further configured to build a three-dimensional model based on the first image and the second image and apply the annotation to the three-dimensional model.

Example 34

The computing device of examples 1-33 or any combination thereof, where the first image or the second image includes a thermal image or an infrared image.

Example 35

The computing device of examples 1-34 or any combination thereof, where the first image or the second image includes an aerial image.

Example 36

The computing device of examples 1-35 or any combination thereof, further including a memory, where the processing circuitry is further configured to store the annotation to the memory and store the image patch to the memory.

Example 37

The computing device of examples 1-36 or any combination thereof, where the annotation includes graphics or text.

Example 38

The computing device of examples 1-37 or any combination thereof, where the annotation includes a marking on the first image.

Example 39

The computing device of examples 1-38 or any combination thereof, where a resolution of the first image is equal to a resolution of the second image.

Example 40

The computing device of examples 1-39 or any combination thereof, where a difference between a resolution of the first image and a resolution of the second image is less than a threshold level, the threshold level being less than ten, five, three, two, or one percent.

Example 41

The computing device of examples 1-40 or any combination thereof, where the processing circuitry is configured to determine a scaling factor at least in part by determining a centroid of the image patch in the first image, determining a centroid of the corresponding image patch in the second image, determining an average distance in a horizontal dimension between the first set of keypoints and the centroid of the image patch in the first image, determining an average distance in the horizontal dimension between the second set of keypoints and the centroid of the image patch in the second image, and determining a horizontal scaling factor based on a ratio of the average distance in the horizontal dimension for the first set of keypoints and the average distance in the horizontal dimension for the second set of keypoints.

Example 42

The computing device of examples 1-41 or any combination thereof, where the processing circuitry is configured to determine a scaling factor at least in part by determining a centroid of the image patch in the first image, determining a centroid of the corresponding image patch in the second image, determining an average distance in a vertical dimension between the first set of keypoints and the centroid of the image patch in the first image, and determining a vertical scaling factor based on a ratio of the average distance in the vertical dimension for the first set of keypoints and the average distance in the vertical dimension for the second set of keypoints.

Example 43

A method includes receiving, by a computing device, a first image and a second image and receiving, by an input device of the computing device, user inputs. The method also includes determining, by processing circuitry of the computing device, an annotation to the first image based on the user inputs. The method includes determining, by the processing circuitry, an image patch in the first image overlapping with the annotation. The method further includes determining, by the processing circuitry, a first set of keypoints in the image patch in the first image, the first set of keypoints being associated with the annotation. The method also includes determining, by the processing circuitry, a position of a corresponding image patch in the second image. The method further includes matching, by the processing circuitry, the first set of keypoints on the image patch in the first image to a second set of keypoints in the corresponding image patch in the second image. The method includes applying, by the processing circuitry, the annotation to the second image based on the position of the corresponding image patch in the second image.

Example 44

The method of example 43, where determining the first set of keypoints in the image patch comprises determining pixel values of a first block of pixels in the image patch.

Example 45

The method of examples 43-44 or any combination thereof, where matching the first set of keypoints to the second set of keypoints comprises determining pixel values of a second block of pixels in the second image that closely matches pixel values of a first block of pixels.

Example 46

The method of examples 43-45 or any combination thereof, where determining that pixel values of the second block of pixels in the second image closely matches pixel values of the first block of pixels comprises determining that a difference between pixel values of the first block of pixels and pixel values of the second block of pixels is less than a threshold level.

Example 47

The method of examples 43-46 or any combination thereof, further including selecting the second image based on a time of capture of the second image.

Example 48

The method of examples 43-47 or any combination thereof, further including determining a set of possible keypoints in the second image using a keypoint detection method and determining the first set of keypoints in the image patch using the keypoint detection method, where the set of possible keypoints includes the second set of keypoints.

Example 49

The method of examples 43-48 or any combination thereof, further including determining whether the second image includes the corresponding image patch comprises matching the first set of keypoints with a set of possible keypoints in the second image and determine the second set of keypoints by matching the first set of keypoints with the set of possible keypoints in the second image.

Example 50

The method of examples 43-49 or any combination thereof, further including determining a position of the corresponding image patch in the second image based on a centroid of the second set of keypoints in the second image.

Example 51

The method of examples 43-50 or any combination thereof, further including determining a scaling factor based on a second set of keypoints in the second image and the first set of keypoints in the image patch.

Example 52

The method of examples 43-51 or any combination thereof, further including creating a third image based on the resolution of the second image and apply the annotation to the third image based on the scaling factor and the position of the image patch in the second image.

Example 53

The method of examples 43-52 or any combination thereof, where the image patch is centered on a centroid of the annotation.

Example 54

The method of examples 43-53 or any combination thereof, where the image patch is less than fully visible in the second image, and matching the first set of keypoints to the second set of keypoints comprises matching fewer than all of the first set of keypoints in the image patch in the first image to the second set of keypoints in the corresponding image patch in the second image.

Example 55

The method of examples 43-54 or any combination thereof, further including determining a scaling factor based on positions of the first set of keypoints in the first image and positions of the second set of keypoints in the second image. Applying the annotation to the second image comprises determining a scaled version of the annotation based on the scaling factor and applying the scaled version of the annotation to the second image.

Example 56

The method of examples 43-55 or any combination thereof, where applying the annotation to the second image comprises redrawing the annotation of the second image.

Example 57

The method of examples 43-56 or any combination thereof, where positions of the first set of keypoints in the first image are different than positions of the second set of keypoints in the second image.

Example 58

The method of examples 43-57 or any combination thereof, where the first image includes a low-resolution version of an image, and the second image includes a high-resolution version of an image.

Example 59

The method of examples 43-58 or any combination thereof, where an orientation of the first image is different than an orientation of the second image.

Example 60

The method of examples 43-59 or any combination thereof, where a zoom of the first image is different than a zoom of the second image.

Example 61

The method of examples 43-60 or any combination thereof, where a light intensity of the first image is different than a light intensity of the second image.

Example 62

The method of examples 43-61 or any combination thereof, where determining the first set of keypoints in the image patch comprises determining a set of unique image features in the image patch.

Example 63

The method of examples 43-62 or any combination thereof, where determining a keypoint of the first set of keypoints comprises determining a corner or an edge of an object in the image patch.

Example 64

The method of examples 43-63 or any combination thereof, where determining a keypoint of the first set of keypoints comprises determining that a change in color or brightness across adjacent pixels in the image patch exceeds a threshold level.

Example 65

The method of examples 43-64 or any combination thereof, where selecting the second image from a set of images comprises determining whether each image of the set of images includes the image patch.

Example 66

The method of examples 43-65 or any combination thereof, where applying the annotation to each image of a set of images that includes the image patch.

Example 67

The method of examples 43-66 or any combination thereof, further including selecting the second image from a set of images at least in part by determining that a difference between a time of capture for the first image and a time of capture for the second image is less than a threshold time duration.

Example 68

The method of examples 43-67 or any combination thereof, further including selecting the second image from a set of images at least in part by determining that a difference between a location of a camera at a time of capture for the first image and a location of the camera at a time of capture for the second image is less than a threshold distance.

Example 69

The method of examples 43-68 or any combination thereof, further including selecting the second image from a set of images at least in part by determining that a difference between an orientation of a camera at a time of capture for the first image and an orientation of the camera at a time of capture for the second image is less than a threshold level.

Example 70

The method of examples 43-69 or any combination thereof, where the second image includes a panoramic image, the method further including creating the second image comprises stitching together two or more images.

Example 71

The method of examples 43-70 or any combination thereof, further including receiving the first image and the second image from a camera.

Example 72

The method of examples 43-71 or any combination thereof, further including receiving the first image and the second image from a camera onboard a vehicle.

Example 73

The method of examples 43-72 or any combination thereof, further including receiving the first image and the second image from a camera onboard an autonomous vehicle.

Example 74

The method of examples 43-73 or any combination thereof, further including receiving the first image and the second image from a camera onboard an unmanned aerial vehicle.

Example 75

The method of examples 43-74 or any combination thereof, further including building a three-dimensional model based on the first image and the second image and applying the annotation to the three-dimensional model.

Example 76

The method of examples 43-75 or any combination thereof, where the first image or the second image includes a thermal image or an infrared image.

Example 77

The method of examples 43-76 or any combination thereof, where the first image or the second image includes an aerial image.

Example 78

The method of examples 43-77 or any combination thereof, further including storing the annotation to the memory and store the image patch to a memory.

Example 79

The method of examples 43-78 or any combination thereof, where the annotation includes graphics or text.

Example 80

The method of examples 43-79 or any combination thereof, where the annotation includes a marking on the first image.

Example 81

The method of examples 43-80 or any combination thereof, where a resolution of the first image is equal to a resolution of the second image.

Example 82

The method of examples 43-81 or any combination thereof, where a difference between a resolution of the first image and a resolution of the second image is less than a threshold level, the threshold level being less than ten, five, three, two, or one percent.

Example 83

The method of examples 43-82 or any combination thereof, where determining a scaling factor comprises determining a centroid of the image patch in the first image, determining a centroid of the corresponding image patch in the second image, determining an average distance in a horizontal dimension between the first set of keypoints and the centroid of the image patch in the first image, determining an average distance in the horizontal dimension between the second set of keypoints and the centroid of the image patch in the second image, and determining a horizontal scaling factor based on a ratio of the average distance in the horizontal dimension for the first set of keypoints and the average distance in the horizontal dimension for the second set of keypoints.

Example 84

The method of examples 43-83 or any combination thereof, where determining a scaling factor comprises determining a centroid of the image patch in the first image, determining a centroid of the corresponding image patch in the second image, determining an average distance in a vertical dimension between the first set of keypoints and the centroid of the image patch in the first image, and determining a vertical scaling factor based on a ratio of the average distance in the vertical dimension for the first set of keypoints and the average distance in the vertical dimension for the second set of keypoints.

Example 85

A device comprising a computer-readable medium having executable instructions stored thereon, configured to be executable by processing circuitry for causing the processing circuitry to perform the method of examples 43-84, or any combination thereof.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, including those attributed to processing circuitry 110, communication module 120, camera 130, display 140, input device 150, and/or memory 160, and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between processing circuitry 110, communication module 120, camera 130, display 140, input device 150, and/or memory 160. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, processing circuitry 110, communication module 120, camera 130, display 140, input device 150, and/or memory 160, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A computing device comprising:
   a display;
   processing circuitry configured to present a first image via the display; and
   an input device configured to receive user inputs,
   wherein the processing circuitry is further configured to:
      determine an annotation to the first image based on the user inputs;
      determine an image patch in the first image overlapping with the annotation;
      determine, in the image patch in the first image, a first set of keypoints associated with the annotation;
      match the first set of keypoints in the image patch in the first image to a second set of keypoints in a corresponding image patch in a second image;
      determine a position of the corresponding image patch in the second image based on matching the first set of keypoints to the second set of keypoints; and
      apply the annotation to the second image based on the position of the corresponding image patch in the second image.

2. The computing device of claim 1,
   wherein the processing circuitry is configured to determine the first set of keypoints in the image patch at least in part by determining pixel values of a first block of pixels in the image patch, and
   wherein the processing circuitry is configured to match the first set of keypoints to the second set of keypoints at least in part by determining that a difference between the pixel values of the first block of pixels and pixel values of a second block of pixels in the second image is less than a threshold level.

3. The computing device of claim 1, wherein the processing circuitry is further configured to:
   select the second image based on a time of capture of the second image;

determine a set of possible keypoints in the second image using a keypoint detection method, wherein the set of possible keypoints includes the second set of keypoints;

determine the first set of keypoints in the image patch using the keypoint detection method;

determine whether the second image includes the corresponding image patch at least in part by matching the first set of keypoints with the set of possible keypoints in the second image;

determine the second set of keypoints by matching the first set of keypoints with the set of possible keypoints in the second image;

determine the position of the corresponding image patch in the second image based on a centroid of the second set of keypoints in the second image;

determine a scaling factor based on the second set of keypoints in the second image and the first set of keypoints in the image patch;

create a third image based on a resolution of the second image; and apply the annotation to the third image based on the scaling factor and the position of the image patch in the second image.

4. The computing device of claim 1, wherein the image patch is centered on a centroid of the annotation.

5. The computing device of claim 1,
wherein the corresponding image patch is less than fully visible in the second image,
wherein the processing circuitry is configured to match the first set of keypoints to the second set of keypoints at least in part by matching fewer than all of the first set of keypoints in the image patch in the first image to the second set of keypoints in the corresponding image patch in the second image.

6. The computing device of claim 1,
wherein the processing circuitry is further configured to determine a scaling factor based on positions of the first set of keypoints in the first image and positions of the second set of keypoints in the second image,
wherein the processing circuitry is configured to apply the annotation to the second image at least in part by:
determining a scaled version of the annotation based on the scaling factor; and
applying the scaled version of the annotation to the second image.

7. The computing device of claim 6, wherein the processing circuitry is configured to determine the scaling factor at least in part by:
determining a centroid of the image patch in the first image;
determining a centroid of the corresponding image patch in the second image;
determining an average distance in a horizontal dimension and in a vertical dimension between the first set of keypoints and the centroid of the image patch in the first image;
determining an average distance in the horizontal dimension and in the vertical dimension between the second set of keypoints and the centroid of the image patch in the second image;
determining a horizontal scaling factor based on a ratio of the average distance in the horizontal dimension for the first set of keypoints and the average distance in the horizontal dimension for the second set of keypoints; and determining a vertical scaling factor based on a ratio of the average distance in the vertical dimension for the first set of keypoints and the average distance in the vertical dimension for the second set of keypoints.

8. The computing device of claim 1, wherein the first image comprises a low-resolution version of an image, and wherein the second image comprises a high-resolution version of the image.

9. The computing device of claim 1, wherein the processing circuitry is configured to determine the first set of keypoints in the image patch at least in part by determining a set of unique image features in the image patch.

10. The computing device of claim 1, wherein the processing circuitry is further configured to:
select the second image from a set of images at least in part by determining whether each image of the set of images includes the image patch; and
apply the annotation to each image of the set of images that includes the image patch.

11. The computing device of claim 1, wherein the processing circuitry is further configured to select the second image from a set of images at least in part by determining that a difference between a time of capture for the first image and a time of capture for the second image is less than a threshold time duration.

12. The computing device of claim 1,
wherein the second image comprises a panoramic image, and
wherein the processing circuitry is further configured to create the second image at least in part by stitching together two or more images.

13. The computing device of claim 1, wherein the processing circuitry is further configured to:
build a three-dimensional model based on the first image and the second image; and
apply the annotation to the three-dimensional model.

14. A method comprising:
receiving, by a computing device, a first image and a second image;
receiving, by an input device of the computing device, user inputs;
determining, by processing circuitry of the computing device, an annotation to the first image based on the user inputs;
determining, by the processing circuitry, an image patch in the first image overlapping with the annotation;
determining, by the processing circuitry, a first set of keypoints in the image patch in the first image, the first set of keypoints being associated with the annotation;
matching, by the processing circuitry, the first set of keypoints on the image patch in the first image to a second set of keypoints in a corresponding image patch in the second image;
determining, by processing circuitry, a position of the corresponding image patch in the second image based on matching the first set of keypoints to the second set of keypoints; and
applying, by the processing circuitry, the annotation to the second image based on the position of the corresponding image patch in the second image.

15. The method of claim 14,
wherein determining the first set of keypoints in the image patch comprises determining pixel values of a first block of pixels in the image patch, and
wherein matching the first set of keypoints to the second set of keypoints comprises determining that a difference between the pixel values of the first block of pixels and pixel values of a second block of pixels in the second image is less than a threshold level.

16. The method of claim 14, further comprising determining a scaling factor based on positions of the first set of keypoints in the first image and positions of the second set of keypoints in the second image,
   wherein applying the annotation to the second image comprises:
      determining a scaled version of the annotation based on the scaling factor; and
      applying the scaled version of the annotation to the second image.

17. A device comprising a computer-readable medium having executable instructions stored thereon, configured to be executable by processing circuitry for causing the processing circuitry to:
   receive a first image and a second image;
   determine an annotation to the first image based on user inputs;
   determine an image patch in the first image overlapping with the annotation;
   determine, in the image patch in the first image, a first set of keypoints associated with the annotation;
   match the first set of keypoints in the image patch in the first image to a second set of keypoints in a corresponding image patch in the second image;
   determine a position of a corresponding image patch in the second image based on matching the first set of keypoints to the second set of keypoints; and
   apply the annotation to the second image based on the position of the corresponding image patch in the second image.

18. The device of claim 17,
   wherein the instructions to determine the first set of keypoints in the image patch comprise instructions to determine pixel values of a first block of pixels in the image patch, and
   wherein the instructions to match the first set of keypoints to the second set of keypoints comprise instructions to determining that a difference between the pixel values of the first block of pixels and pixel values of a second block of pixels in the second image is less than a threshold level.

19. The device of claim 17,
   wherein the instructions are configured to be executable by the processing circuitry for causing the processing circuitry to determine a scaling factor based on positions of the first set of keypoints in the first image and positions of the second set of keypoints in the second image,
   wherein the instructions to apply the annotation to the second image comprise instructions to:
      determine a scaled version of the annotation based on the scaling factor; and
      apply the scaled version of the annotation to the second image.

20. The device of claim 17, wherein the instructions are configured to be executable by the processing circuitry for causing the processing circuitry to:
   build a three-dimensional model based on the first image and the second image; and
   apply the annotation to the three-dimensional model.

* * * * *